United States Patent
Huang

(10) Patent No.: US 8,116,107 B2
(45) Date of Patent: Feb. 14, 2012

(54) SYNCHRONOUS RECTIFICATION CONTROL CIRCUIT ASSEMBLY

(75) Inventor: Ming-Ho Huang, Taipei Hsien (TW)

(73) Assignee: Chicony Power Technology Co., Ltd., Taipei Hsien (TW)

( * ) Notice: Subject to any disclaimer, the term of this patent is extended or adjusted under 35 U.S.C. 154(b) by 651 days.

(21) Appl. No.: 12/271,416

(22) Filed: Nov. 14, 2008

(65) Prior Publication Data

US 2009/0161390 A1 Jun. 25, 2009

(30) Foreign Application Priority Data

Nov. 15, 2007 (CN) .................................. 0962 1 9277

(51) Int. Cl.
*H02M 7/217* (2006.01)
(52) U.S. Cl. .................... 363/127; 363/21.06; 363/21.14

(58) Field of Classification Search .................. 363/127, 363/16, 17, 21.06, 21.14, 76, 77, 78
See application file for complete search history.

(56) References Cited

U.S. PATENT DOCUMENTS

| | | | |
|---|---|---|---|
| 6,169,683 B1 * | 1/2001 | Farrington | 363/127 |
| 7,400,519 B2 * | 7/2008 | Yoshida et al. | 363/127 |
| 2004/0109335 A1 * | 6/2004 | Gan et al. | 363/127 |

* cited by examiner

*Primary Examiner* — Harry Behm
*Assistant Examiner* — Matthew Grubb
(74) *Attorney, Agent, or Firm* — Muncy, Geissler, Olds & Lowe, PLLC

(57) ABSTRACT

A synchronous rectification control circuit assembly includes a first transformer, a reference voltage generator, a first PWM control signal generating circuit, a second PWM control signal generating circuit, a first synchronous rectification circuit, and a second synchronous rectification circuit. When the output voltage rises, the conduction time of the first synchronous rectification circuit and the second synchronous rectification circuit are relatively regulated to lower the output voltage, maintaining stability of the output voltage.

12 Claims, 3 Drawing Sheets

US 8,116,107 B2

SYNCHRONOUS RECTIFICATION CONTROL CIRCUIT ASSEMBLY

BACKGROUND OF THE INVENTION

1. Field of the Invention

The present invention relates generally to a synchronous rectification circuit and more particularly, to a synchronous rectification control circuit assembly that uses a pulse width modulation signal to regulate the conduction time of the synchronous rectification switch, maintaining voltage output stability.

2. Description of the Related Art

In a conventional synchronous rectifier switch control circuit, the synchronous rectifier switch is controlled in its saturated region or linear region of operation. However, upon a variation of the load, for example, light-load where the output voltage rises from +5V to +6V or +7V, a cross regulation will occur in the other voltage outputs. At this time, the synchronous rectifier switch can only be controlled in its saturated region or linear region of operation, and cannot effectively maintain stability of the voltage output, lowering the cross regulation effect.

Therefore, it is desirable to provide a synchronous rectification circuit that eliminates the aforesaid problem.

SUMMARY OF THE INVENTION

The present invention has been accomplished under the circumstances in view. It is the main object of the present invention to provide a synchronous rectification control circuit assembly that uses a PWM (pulse width modulation) signal to regulate the conduction time of the synchronous rectification switch, maintaining voltage output stability.

To achieve this and other objects of the present invention, the synchronous rectification control circuit assembly comprises a first transformer, the first transformer having a primary side and a secondary side, the primary side comprising a first winding, the secondary side comprising a second winding, a third winding, a fourth winding and a fifth winding, the second winding and the third winding being connected in series to grounding potential, the first winding having two opposite ends thereof coupled to a driving signal, the second winding and the third winding being adapted to reverse the phase of the driving signal and to convert the driving signal into a second driving signal and a third driving signal respectively; a reference voltage generating circuit coupled to a first power source and adapted to generate a reference voltage subject to an output voltage; a first pulse width modulation control signal generating circuit coupled to a second power source and adapted to generate a first pulse width modulation control signal subject to the second driving signal and the reference voltage; a second pulse width modulation control signal generating circuit coupled to the second power source and adapted to generate a second pulse width modulation control signal subject to the third driving signal and the reference voltage; a first synchronous rectification circuit, the first synchronous rectification circuit being controlled to output the output voltage through an output terminal thereof subject to the control of the first pulse width modulation control signal; and a second synchronous rectification circuit, the second synchronous rectification circuit being controlled to output the output voltage through an output terminal thereof subject to the control of the second pulse width modulation control signal. When the output voltage rises, the conduction time of the first synchronous rectification circuit and the second synchronous rectification circuit are relatively regulated to lower the output voltage, maintaining stability of the output voltage.

DETAILED DESCRIPTION OF THE INVENTION

Figure 1:
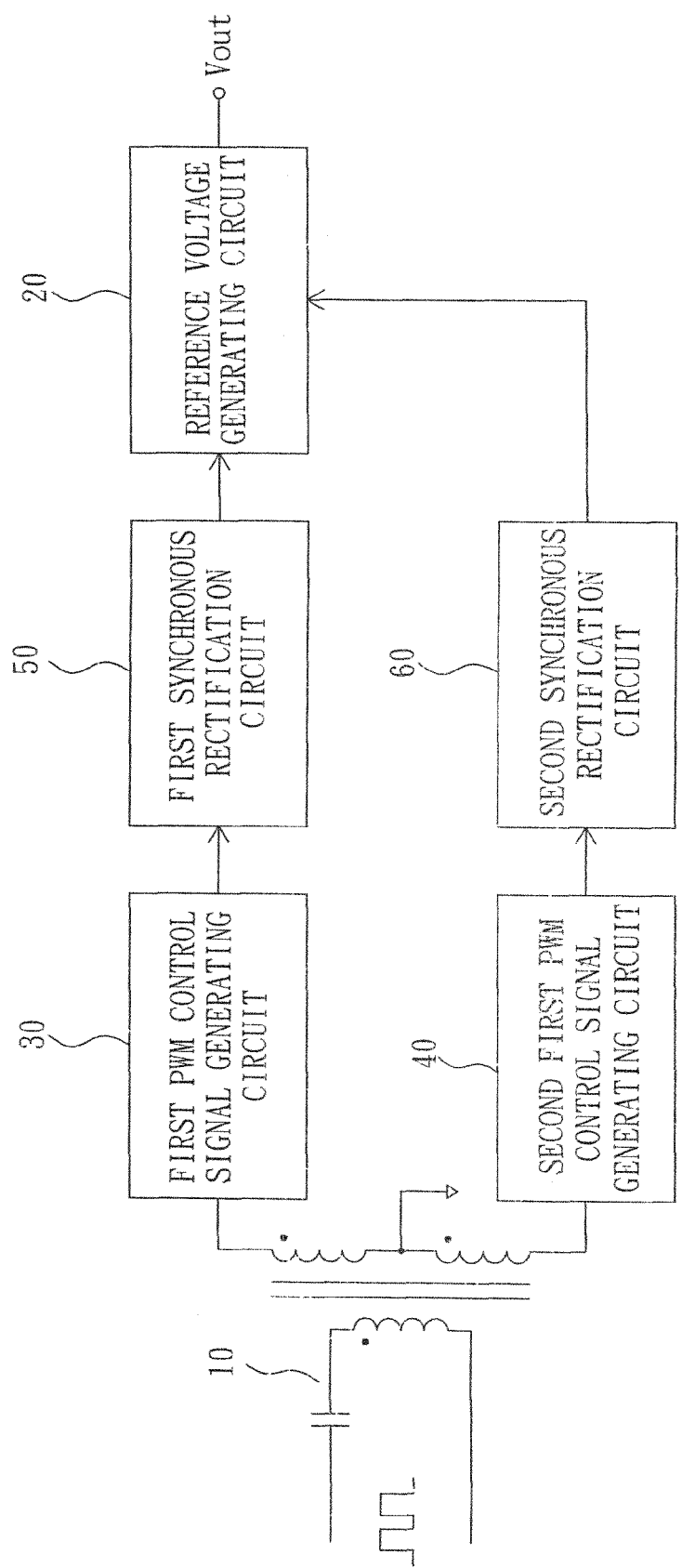
FIG. 1 is a circuit block diagram of a synchronous rectification control circuit assembly according to the present invention.
Figure 2:
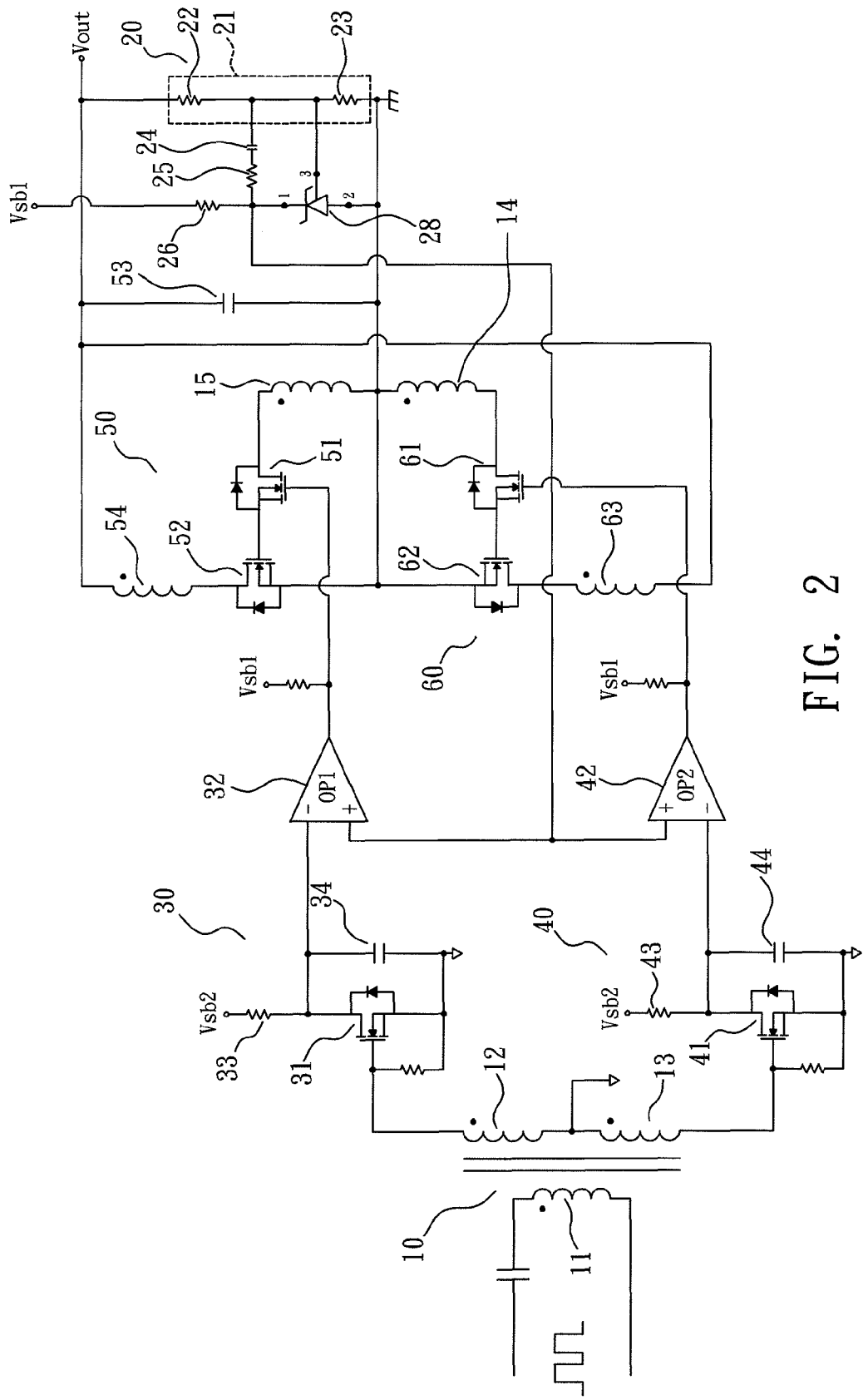
FIG. 2 is a detailed circuit diagram of the synchronous rectification control circuit assembly according to the present invention.
Figure 3:
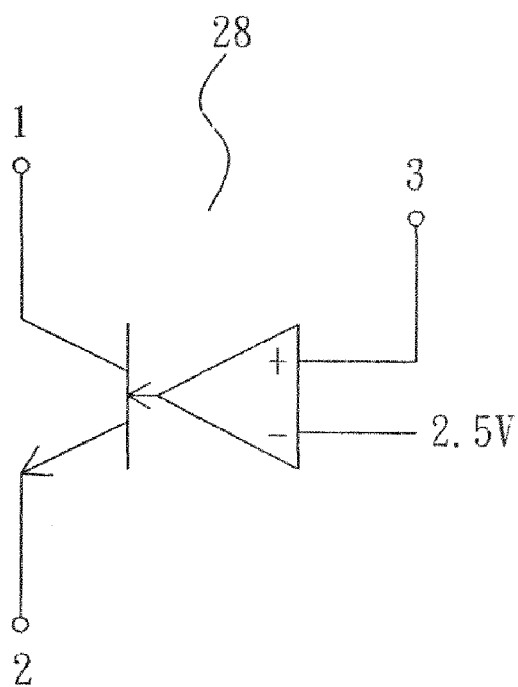
FIG. 3 is a detailed circuit diagram of the voltage comparator circuit of the synchronous rectification control circuit assembly according to the present invention.

FIG. 1 is a circuit block diagram of a synchronous rectification control circuit assembly according to the present invention. FIG. 2 is a detailed circuit diagram of the synchronous rectification circuit according to the present invention. FIG. 3 is a detailed circuit diagram of the voltage comparator circuit according to the present invention. As shown in FIGS. 1~3, the synchronous rectification circuit in accordance with the present invention is shown comprises a first transformer 10, a reference voltage generating circuit 20, a first PWM (pulse width modulation) control signal generating circuit 30, a second first PWM (pulse width modulation) control signal generating circuit 40, a first synchronous rectification circuit 50, and a second synchronous rectification circuit 60.

The first transformer 10 has a primary side and a secondary side. The primary side comprises a first winding 11. The secondary side comprises a second winding 12, a third winding 13, a fourth winding 14 and a fifth winding 15. The second winding 12 and the third winding 13 are connected in series to ground potential (GND). The first winding 11 has its two opposite ends coupled to a driving signal. The second winding 12 and the third winding 13 are adapted to convert the driving signal into a reverse phase of second driving signal and a reverse phase of third driving signal respectively. The first transformer 10 can be, but not limited to, a driving signal transformer. Because this driving signal transformer is a well-known power adapter, no further detailed description in this regard is necessary. Further, the fourth winding 14 and the fifth winding 15 of the first transformer 10 have N2 number of turns.

The reference voltage generating circuit 20 is coupled to a first power source (Vsb1) adapted to generate a reference voltage (Vref) subject to an output voltage (Vout). As shown in FIG. 2, the reference voltage generating circuit 20 comprises a voltage-dividing circuit 21, a fourth resistor 26, and a voltage comparator circuit 28.

The voltage-dividing circuit 21 comprises a first resistor 22 and a second resistor 23. The first resistor 22 has one end coupled to the output voltage (Vout), and the other end coupled to one end of the second resistor 23. The second resistor 23 has its other end coupled to ground potential. Further, a first capacitor 24 and a third resistor 25 are connected in parallel between the first resistor 22 and the second resistor 23.

The fourth resistor 26 has one end coupled to the first power source (Vsb1). The voltage comparator circuit 28 can be, but not limited to, a Triac that has its first end coupled to the other end of the fourth resistor 26, its second end coupled to ground potential, and its third end coupled to the first resistor 22 and the second resistor 23. The equivalent circuit of the voltage comparator circuit 28, as shown in FIG. 3, is comprised of an operation amplifier 281 and a transistor 282 connected in series to the operation amplifier 281. The transistor 282 can be, but not limited to, a NPN transistor. When the voltage at the non-inverter terminal is greater than the voltage at the inverter terminal, the operation amplifier 281 outputs a high potential to conduct the transistor 282, causing the transistor 282 to output a base-emitter voltage about 0.7V~1V. On the contrary, when the voltage the voltage at the non-inverter terminal is smaller than the voltage at the inverter terminal, the operation amplifier 281 outputs a low potential to turn off the transistor 282, causing the transistor 282 to output a base-emitter voltage about 2.5V. This operation principle will be described further.

The first PWM control signal generator 30 is coupled to a second power source (Vsb2), and adapted to output a PWM (pulse width modulation) control signal subject to the aforesaid second driving signal and reference voltage. As shown in FIG. 2, the first PWM control signal generator 30 comprises a first switch 31 and a first comparator 32.

The first switch 31 has its first end coupled to the second power source (Vsb2) via the fifth resistor 33, its second end coupled to one end of the second winding 12, and its third end coupled to ground potential. Further, a second capacitor 34 is connected in parallel to the junction between the first end and third end of the first switch 31 such that the fifth resistor 33 and the second capacitor 34 constitute a first charging loop. The first switch 31 can be, but not limited to, a power switch that can be a N-pass MOSFET (metal-oxide semiconductor field-effect) transistor, N-pass JFET (junction field-effect) transistor, P-pass MOSFET (metal-oxide semiconductor field-effect) transistor, or P-pass JFET (junction field-effect) transistor. The first end, second end and third end of the first switch 31 can be the drain, the gate and the source respectively.

The first comparator 32 can be, but not limited to, an operation amplifier (OPA), having its first input end, for example, inverter terminal coupled to one end of the second capacitor 34, and its second input end, for example, non-inverter terminal coupled to the reference voltage. Subject to the output voltage of the second capacitor 34 and the reference voltage, the first comparator 32 generates the first PWM control signal. For example, when the reference voltage is 2.5V, the second driving signal is at high potential and the third driving signal is at low potential, the first switch 31 is conducted, and at this time the voltage at the inverter terminal of the first comparator 32 is smaller than the voltage at the non-inverter terminal, therefore the first comparator 32 outputs a high potential.

The second PWM control signal generating circuit 40 is coupled to the second power source (Vsb2), and adapted to output a second PWM control signal subject to the third driving signal and the reference voltage. As shown in FIG. 2, the second PWM control signal generating circuit 40 comprises a second switch 41 and a second comparator 42.

The second switch 41 has its first end coupled to the second power source (Vsb2) via a sixth resistor 43, its second end coupled to one end of the third winding 13, and its third end coupled to ground potential. Further, a third capacitor 44 is connected in parallel to the junction between the first end and the third end such that the sixth resistor 43 and the third capacitor 44 constitute a second charging loop. The second switch 41 can be, but not limited to, a power switch that can be a N-pass MOSFET (metal-oxide semiconductor field-effect) transistor, N-pass JFET (junction field-effect) transistor, P-pass MOSFET (metal-oxide semiconductor field-effect) transistor, or P-pass JFET (junction field-effect) transistor. The first end, second end and third end of the second switch 41 can be the drain, the gate and the source respectively.

The second comparator 42 can be, but not limited to, an operation amplifier (OPA), having its first input end, for example, inverter terminal coupled to one end of the third capacitor 44, and its second input end, for example, non-inverter terminal coupled to the reference voltage. Subject to the output voltage of the third capacitor 44 and the reference voltage, the second comparator 42 generates the second PWM control signal. The operation principle is similar to that of the aforesaid first comparator 32, therefore no further detailed description in this regard is necessary.

Referring to FIG. 2 again, the first synchronous rectification circuit 50 comprises a third switch 61, a fourth switch 52, and an output capacitor 53.

The third switch 51 has its first end coupled to one end of the fourth winding 14, its second end coupled to the output terminal of the first PWM control signal generating circuit 30 (i.e., the output terminal of the first comparator 32), and its third end coupled to the fourth switch 52.

The fourth switch 52 has its first end coupled to one end of the second winding 54 of the secondary side of a LLC master transformer (of the known art, not shown), its second end coupled to one end of the third switch 51, and its third end coupled to the other end of the fourth winding 14. The third switch 51 and the fourth switch 52 can be, but not limited to, a power switch that can be a N-pass MOSFET (metal-oxide semiconductor field-effect) transistor, N-pass JFET (junction field-effect) transistor, P-pass MOSFET (metal-oxide semiconductor field-effect) transistor, or P-pass JFET (junction field-effect) transistor. The first end, second end and third end of the fourth switch 52 can be the drain, the gate and the source respectively.

The output capacitor 53 has its one end coupled to the other end of the second winding 54 of the LLC master transformer, and its other end coupled to the other end of the fourth winding 14. Subject to charging by the second winding 54 at the secondary side of the LLC master transformer, the output capacitor 53 outputs the aforesaid output voltage (Vout).

The second synchronous rectification circuit 60 comprises a fifth switch 61 and a sixth switch 62.

The fifth switch 61 has its first end coupled to one end of the fifth winding 15, and its second end coupled to the output terminal of the second PWM control signal generating circuit (i.e., the output terminal of the second comparator 42), and its third end coupled to the sixth switch 62.

The sixth switch 62 has its first end coupled to one end of the third winding 63 at the secondary side of the LLC master transformer, its second end coupled to the first end of the fifth switch 61, and its third end coupled to the other end of the third winding 63. The fifth switch 61 and the sixth switch 62 can be, but not limited to, a power switch that can be a N-pass MOSFET (metal-oxide semiconductor field-effect) transistor, N-pass JFET function field-effect) transistor, P-pass MOSFET (metal-oxide semiconductor field-effect) transistor, or P-pass JFET function field-effect) transistor. The first end, second end and third end of the fifth switch 61 can be the drain, the gate and the source respectively. The first end, second end and third end of the sixth switch 62 can be the drain, the gate and the source respectively.

During operation, if the normal value of the output voltage (Vout) is 5V, the second resistor 23 will have a 2.5V voltage drop, and this 2.5V will be outputted to the non-converter terminal of the operation amplifier 281. Because this voltage is not greater than the 2.5V reference voltage at its inverter terminal, the operation amplifier 281 will output a low potential to turn off the transistor 282. At this time, the base-emitter will be output a voltage about 2.5V. This 2.5V output voltage will be respectively outputted to the non-inverter terminal of the first comparator 32 and the non-inverter terminal of the second comparator 42 for use as their reference voltage. When the second driving signal is at the positive half cycle and the third driving signal is at the negative half cycle, the first switch 31 will be conducted to turn off the second switch 41. At this time, the voltage at the second capacitor 34 will be about 1V and will be outputted to the inverter terminal of the first comparator 32. Because this 1V is smaller than the reference voltage 2.5V, the first comparator 32 will output a high potential to conduct the third switch 51 and then the fourth switch 52, i.e., the third switch 51 and the fourth switch 52 are conducted during the whole half cycle. Thus, the second winding 54 will store energy and will charge the output capacitor 53, keeping the output voltage at DC5V. The operation status during the negative half cycle is similar to that during the positive half cycle, therefore not further detailed description in this regard is necessary.

When the output voltage rises to, for example, 6V, the second resistor 23 will have a voltage greater than 2.5V, and this voltage will be outputted to the non-converter terminal of the operation amplifier 281. Because this voltage is greater than the 2.5V reference voltage at its inverter terminal, the operation amplifier 281 will output a high potential to turn on the transistor 282. At this time, the base-emitter will be output a voltage about 1.0V. This 1.0V output voltage will be respectively outputted to the non-inverter terminal of the first comparator 32 and the non-inverter terminal of the second comparator 42 for use as their reference voltage. At this time, the voltage at the second capacitor 34 is $\geq 1.0V$ reference voltage. Therefore, the first comparator 32 will output a low potential to turn off the third switch 51 and then the fourth switch 52. Thus, the voltage drop at the fourth switch 52 will be increased, and the energy stored in the second winding 54 will be lowered, thereby lowering the charging energy for the output capacitor 53 and maintaining the output voltage at DC5V. By means of converting the second driving signal and the third driving signal into a PWM signal to regulate the conduction time of the fourth switch 52 at the second driving signal half cycle, the output voltage of the output capacitor 53 is maintained at DC 5.0V to reduce cross-regulation due to a voltage rise during light-load. Therefore, when compared with conventional synchronous rectifier control circuit, the invention has inventive step characteristic.

As stated above, the invention provides a synchronous rectifier control circuit that uses a PWM signal to regulate the conduction time of the synchronous rectification switch, maintaining output voltage stability.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A synchronous rectification control circuit assembly comprising:
   a first transformer, said first transformer having a primary side and a secondary side, said primary side comprising a first winding, said secondary side comprising a second winding, a third winding, a fourth winding and a fifth winding, said second winding and said third winding being connected in series to grounding potential, said first winding having two opposite ends thereof coupled to a driving signal, said second winding and said third winding being adapted to reverse the phase of said driving signal and to convert said driving signal into a second driving signal and a third driving signal respectively;
   a reference voltage generating circuit coupled to a first power source and adapted to generate a reference voltage subject to an output voltage;
   a first pulse width modulation control signal generating circuit coupled to a second power source and adapted to generate a first pulse width modulation control signal subject to said second driving signal and said reference voltage;
   a second pulse width modulation control signal generating circuit coupled to said second power source and adapted to generate a second pulse width modulation control signal subject to said third driving signal and said reference voltage;
   a first synchronous rectification circuit said first synchronous rectification circuit being controlled to output said output voltage through an output terminal thereof subject to the control of said first pulse width modulation control signal; and
   a second synchronous rectification circuit, said second synchronous rectification circuit being controlled to output said output voltage through an output terminal thereof subject to the control of said second pulse width modulation control signal;
   wherein when said output voltage rises, the conduction time of said first synchronous rectification circuit and said second synchronous rectification circuit are relatively regulated to maintain stability of said output voltage.

2. The synchronous rectification control circuit assembly as claimed in claim 1, wherein said first transformer is a driving signal transformer.

3. The synchronous rectification control circuit assembly as claimed in claim 1, wherein said reference voltage generating circuit comprises:
   a voltage-dividing circuit, said voltage-dividing circuit comprising a first resistor, a second resistor connected and a third resistor, said first resistor having a first end coupled to said output voltage and a second end coupled to said second resistor, said second resistor having a first end coupled to the second end of said first resistor and a second end coupled to grounding potential, said third resistor being connected in parallel to the junction between said first resistor and said second resistor;
   a fourth resistor, said fourth resistor having one end coupled to said first power source; and
   a voltage comparator circuit, said voltage comparator circuit having a first end coupled to an opposite end of said fourth resistor, a second end coupled to grounding potential, and a third end coupled to the junction between said first resistor and said second resistor;
   wherein when the voltage at said second resistor is below a predetermined voltage, said voltage comparator circuit outputs said reference voltage at a voltage level equal to said predetermined voltage; when the voltage at said second resistor is above said predetermined voltage, said voltage comparator circuit outputs said reference voltage at a voltage level below said predetermined voltage.

4. The synchronous rectification control circuit assembly as claimed in claim 3, wherein said output voltage is DC5V, and said predetermined voltage is DC2.5V.

5. The synchronous rectification control circuit assembly as claimed in claim 1, wherein said first pulse width modulation control signal generating circuit comprises:
   a first switch, said first switch having a first end coupled to said second power source via a fifth resistor, a second end coupled to one end of said second winding, a third end coupled to grounding potential and a second capacitor connected in parallel to the junction between the first end and third end of said first switch for enabling said fifth resistor and said second capacitor to constitute a first charging loop; and a first comparator, said first comparator having a first input terminal coupled to one end of said second capacitor and a second input terminal coupled to said reference voltage, said first comparator outputting said first pulse width modulation control signal subject to the output voltage of said second capacitor and said reference voltage.

6. The synchronous rectification control circuit assembly as claimed in claim 5, wherein said first comparator is an operation amplifier, said first switch is a power switch selected from one of N-pass MOSFET (metal-oxide semiconductor field-effect) transistor, N-pass JFET (junction field-effect) transistor, P-pass MOSFET (metal-oxide semiconductor field-effect) transistor, and P-pass JFET (junction field-effect) transistor in which the first end, second end and third end of said first switch are the drain, the gate and the source respectively.

7. The synchronous rectification control circuit assembly as claimed in claim 1, wherein said second pulse width modulation control signal generating circuit comprises:
a second switch, said second switch having a first end coupled to said second power source via a sixth resistor, a second end coupled to an opposite end of said third winding, a third end coupled to grounding potential, and a third capacitor connected in parallel to the junction between the first end and third end of said second switch for enabling said sixth resistor and said third capacitor to constitute a second charging loop; and
a second comparator, said second comparator having a first input terminal coupled to an output terminal of said third capacitor and a second input end coupled to said reference voltage, said second comparator outputting said second pulse width modulation control signal subject to the output voltage of said third capacitor and said reference voltage.

8. The synchronous rectification control circuit assembly as claimed in claim 7, wherein said second comparator is an operation amplifier, said second switch is a power switch selected from one of N-pass MOSFET (metal-oxide semiconductor field-effect) transistor, N-pass JFET function field-effect) transistor, P-pass MOSFET (metal-oxide semiconductor field-effect) transistor, and P-pass JFET (junction field-effect) transistor in which the first end, second end and third end of said second switch are the drain, the gate and the source respectively.

9. The synchronous rectification control circuit assembly as claimed in claim 1, wherein said first synchronous rectification circuit comprises:

a third switch, said third switch having a first end coupled to one end of said fourth winding, a second end coupled to the output terminal of said first pulse width modulation control signal generating circuit, and a third end coupled to a fourth switch;
the fourth switch, said fourth switch having a first end coupled to one end of a second LLC winding at a secondary side of a LLC transformer, a second end coupled to the first end of said third switch, and a third end coupled to an opposite end of said fourth winding; and
an output capacitor, said output capacitor having one end coupled to an opposite end of the second winding at the secondary side of said LLC transformer and an opposite end coupled to an opposite end of said fourth winding, said output capacitor being chargeable by the second winding at the secondary side of said LLC transformer to output said output voltage.

10. The synchronous rectification control circuit assembly as claimed in claim 9, wherein said third switch and said fourth switch are a power switch selected from one of N-pass MOSFET (metal-oxide semiconductor field-effect) transistor, N-pass JFET (junction field-effect) transistor, P-pass MOSFET (metal-oxide semiconductor field-effect) transistor, and P-pass JFET (junction field-effect) transistor in which the first end, second end and third end of each of said third switch and said fourth switch are the drain, the gate and the source respectively.

11. The synchronous rectification control circuit assembly as claimed in claim 1, wherein said second synchronous rectification circuit comprises:
a fifth switch, said fifth switch having a first end coupled to one end of said fifth winding, a second end coupled to the output terminal of said second pulse width modulation control signal generating circuit, and a third end coupled to a sixth switch; and
the sixth switch, said sixth switch having a first end coupled to one end of a third LLC winding at the secondary side of said LLC transformer, a second end coupled to the first end of said fifth switch, and a third end coupled to an opposite end of said fifth winding.

12. The synchronous rectification control circuit assembly as claimed in claim 11, wherein said fifth switch and said sixth switch are a power switch selected from one of N-pass MOSFET (metal-oxide semiconductor field-effect) transistor, N-pass JFET (junction field-effect) transistor, P-pass MOSFET (metal-oxide semiconductor field-effect) transistor, and P-pass JFET function field-effect) transistor in which the first end, second end and third end of each of said fifth switch and said sixth switch are the drain, the gate and the source respectively.

* * * * *